(12) United States Patent
Jo et al.

(10) Patent No.: US 8,994,634 B2
(45) Date of Patent: Mar. 31, 2015

(54) DISPLAY DEVICE

(75) Inventors: JaeHyung Jo, Busan (KR); JongSin Park, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 132 days.

(21) Appl. No.: 13/563,392

(22) Filed: Jul. 31, 2012

(65) Prior Publication Data

US 2013/0120231 A1 May 16, 2013

(30) Foreign Application Priority Data

Nov. 11, 2011 (KR) .......................... 10-2011-0117526

(51) Int. Cl.
*G09G 3/36* (2006.01)
*G02F 1/1345* (2006.01)
*G02F 1/1335* (2006.01)

(52) U.S. Cl.
CPC ...... *G02F 1/13452* (2013.01); *G02F 1/133512* (2013.01); *G02F 2201/12* (2013.01)
USPC .......................................................... 345/98

(58) Field of Classification Search
USPC .................... 345/80, 87, 92, 98; 349/153
See application file for complete search history.

(56) References Cited

U.S. PATENT DOCUMENTS 5,798,744 A * 8/1998 Tanaka et al. ................... 345/92
6,639,589 B1 * 10/2003 Kim et al. ...................... 345/206

FOREIGN PATENT DOCUMENTS

KR 20020058555 A 7/2002
KR 20080055192 A 6/2008

* cited by examiner

*Primary Examiner* — Yong H Sim
(74) *Attorney, Agent, or Firm* — Brinks Gilson & Lione

(57) ABSTRACT

Disclosed is a display device. The display device includes first and second substrates, a plurality of gate lines and data lines, a connection line, a signal line, and a first bridge. The first and second substrates face each other. The gate lines and data lines are formed on the first substrate to define a plurality of pixels by an intersection therebetween. The connection line is formed on the first substrate to be electrically connected to the gate line. The signal line is formed on the second substrate for supplying a signal to the gate line. The first bridge is formed on the second substrate for electrically connecting the signal line and the connection line.

13 Claims, 12 Drawing Sheets

DISPLAY DEVICE

This application claims the priority and the benefit under 35 U.S.C. §119(a) on Korean Patent Application No. 10 2011-0117526 filed on Nov. 11, 2011, the entire contents of which are hereby incorporated by reference.

BACKGROUND

1. Field of the Invention

The present disclosure relates to a display device, and more particularly, to a display device with enhanced aesthetic appearance.

2. Discussion of the Related Art

Generally, since LCD devices are driven with a low operating voltage, LCD devices have low power consumption and are used as portable devices. Accordingly, the LCD devices are widely applied to various fields such as notebook computers, monitors, spacecrafts, airplanes, etc.

The LCD devices have been enlarged in size due to the decrease in weight and volume. In the LCD devices, moreover, research and development are being continuously done on a response time and image quality, leading to the much advance of quality.

Recently, research and development are being done on the above-described technology and the design of products appealing to consumers. For example, in LCD devices, research and development are being continuously done on a design with enhanced aesthetic appearance that can induce consumers to buy by minimizing a thickness and appealing to consumers' aesthetic appearance.

Hereinafter, a related art LCD device will be described in detail with reference to the drawings.

FIG. 1 is a sectional view schematically illustrating a related art LCD device.

As seen in FIG. 1, the related art LCD device includes a lower substrate 10, an upper substrate 20, a liquid crystal layer 30, and a driver 40.

The lower substrate 10 faces the upper substrate 20, and the liquid crystal layer 30 is formed between the lower substrate 10 and the upper substrate 20.

Various lines such as a gate line and a data line are formed on the lower substrate 10. To apply signals to the respective lines, one side periphery area of the lower substrate 10 is exposed externally.

The driver 40 is formed in the externally exposed one side periphery area of the lower substrate 10, and supplies respective signals to a plurality of lines.

The driver 40 includes a circuit film 41, a Printed Circuit Board (PCB) 42, and a driving chip 43. The circuit film 41 is adhered to the lower substrate 10 at one end of the circuit film 41, and the other end of the circuit film 41 is connected to the PCB 42. The PCB 42 applies various signals to the lower substrate 10 through the circuit film 41. For this end, a timing controller, various power source circuits, and a memory are mounted on the PCB 42. The driving chip 43 is formed on the circuit film 41 and drives a plurality of data lines and gate lines.

FIG. 2 is a plan view schematically illustrating a related art LCD device. FIG. 2A is a plan view schematically illustrating a related art lower substrate. FIG. 2B is a plan view schematically illustrating a related art upper substrate.

As described above, the driver 40 supplies respective signals to the gate lines and data lines of the LCD device. Accordingly, the driver 40 is disposed at the left or right periphery portion of the LCD device for supplying respective signals to the gate lines, and disposed at the upper or lower periphery portion of the LCD device for supplying respective signals to the data lines.

To reduce the product price and the weight, the Gate In Panel (GIP) type LCD device has been proposed. In the GIP LCD device, some circuits necessary for gate driver are formed directly on a lower substrate. FIGS. 2A and 2B illustrate the GIP type LCD device.

As seen in FIG. 2A, the related art lower substrate 10 includes a display area that displays an image and a non-display area that cannot display an image.

In the display area, a plurality of gate lines 12 and data lines 11 are intersected and formed, thereby defining a plurality of pixels. A thin film transistor T as a switching element is formed in each of the pixels.

A plurality of elements for supplying signals to the display area are formed in the non-display area. Specifically, pads 13a and 13b, a signal line 14, a GIP circuit block 15, and a connection line 16 are formed in the non-display area.

The pads 13a and 13b are connected to the driver 40, and include a gate pad 13a and a data pad 13b.

The gate pad 13a and the signal line 14 are formed as one body, the signal line 14 is connected to the GIP circuit block 15 through the connection line 16, and the GIP circuit block 15 is connected to the gate line 12.

The data pad 13b is connected to the data line 11.

As seen in FIG. 2B, the related art upper substrate 20 includes a display area that displays an image and a non-display area that cannot display an image.

Red (R), green (G), and blue (B) color filters 22 are formed in the display area. The color filters 22 are divided by a black matrix 24.

The black matrix 24 is formed in the non-display area, thereby preventing the leakage of light.

In the related art LCD device, since the GIP circuit block 15 and the signal line 14 are complicatedly formed in the non-display area of the lower substrate 10, the size of the non-display area increases inevitably, and thus, the size of the peripheral portion of the LCD device, namely, the size of the Bezel increases.

To provide a more detailed description, a method of decreasing the GIP circuit block 15 area and a method of decreasing the signal line 14 area can be considered for reducing the size of the non-display area of the lower substrate 10. However; a gate driver Integrated Circuit (IC) and a plurality of transistors for performing a portion of a gate PCB function are disposed in the GIP circuit block 15 area, and thus, it is actually difficult to reduce the GIP circuit block 15 area. Also, the decrease in the width of the signal line 14 is required for reducing the signal line 14 area, but when decreasing the width of the signal line 14, the resistance of the signal line 14 increases.

As a result, the related art LCD device has limitations in reducing the size of the Bezel that is the peripheral portion thereof.

BRIEF SUMMARY

A display device includes: first and second substrates facing each other; a plurality of gate lines and data lines formed on the first substrate to define a plurality of pixels by an intersection therebetween; a connection line formed on the first substrate to be electrically connected to the gate line; a signal line formed on the second substrate for supplying a signal to the gate line; and a first bridge formed on the second substrate for electrically connecting the signal line and the connection line.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE DRAWINGS AND THE PRESENTLY PREFERRED EMBODIMENTS

Reference will now be made in detail to the exemplary embodiments of the present invention, examples of which are illustrated in the accompanying drawings. Wherever possible, the same reference numbers will be used throughout the drawings to refer to the same or like parts.

Hereinafter, embodiments of the present invention will be described in detail with reference to the accompanying drawings.

Figure 1:
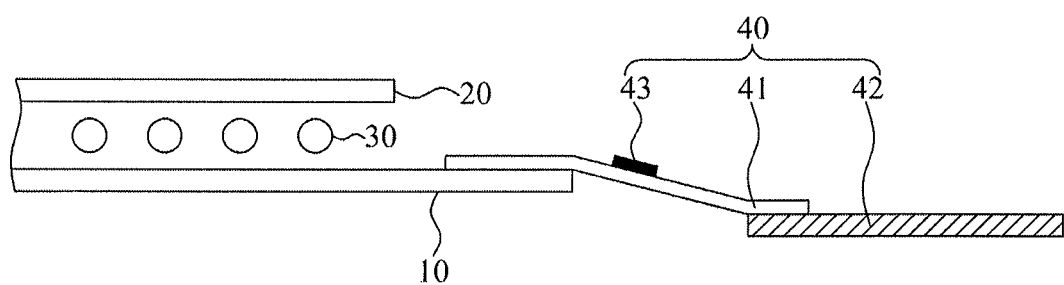
FIG. 1 is a sectional view schematically illustrating a related art LCD device.
Figure 2A:
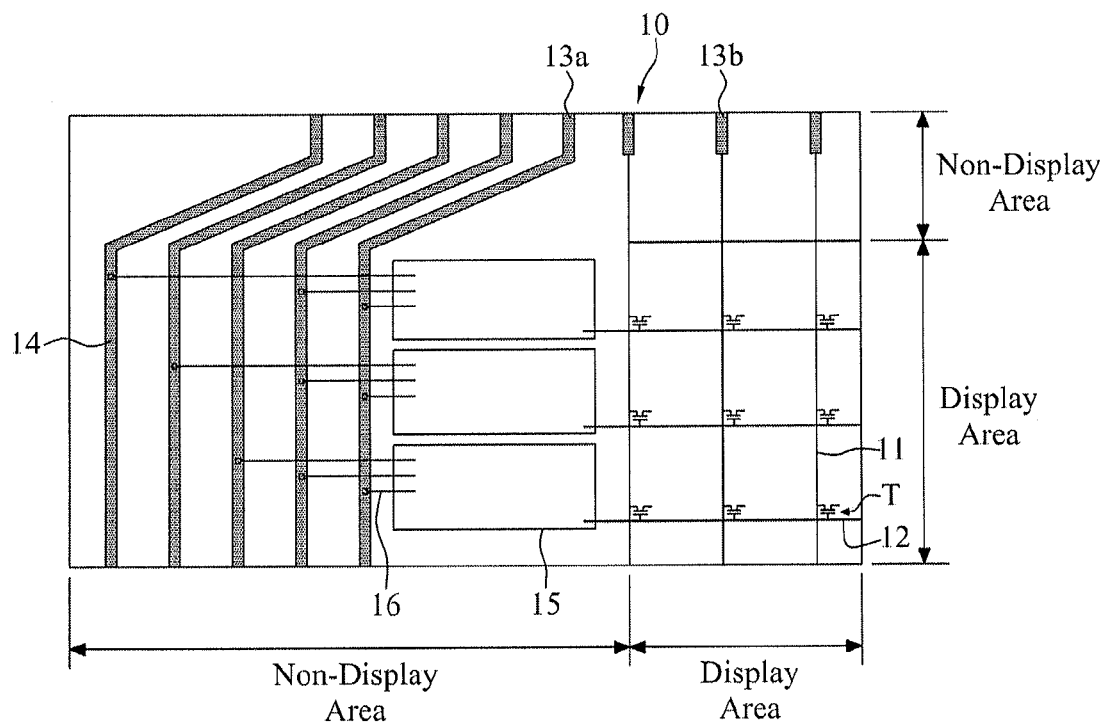
FIG. 2A is a plan view schematically illustrating a lower substrate of the related art LCD device.
Figure 2B:
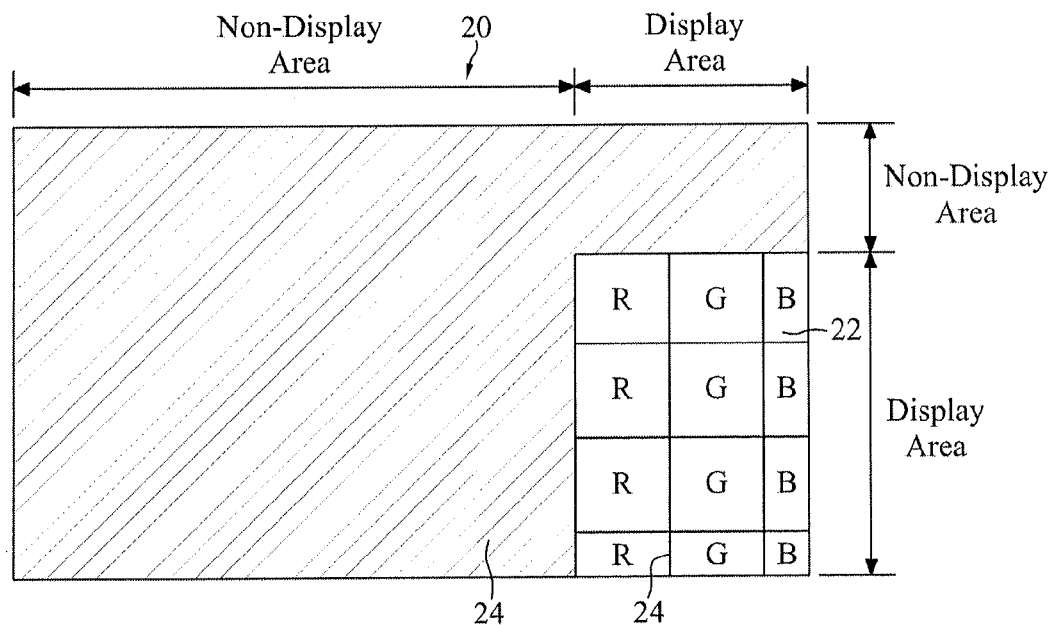
FIG. 2B is a plan view schematically illustrating a upper substrate of the related art LCD device.
Figure 3A:
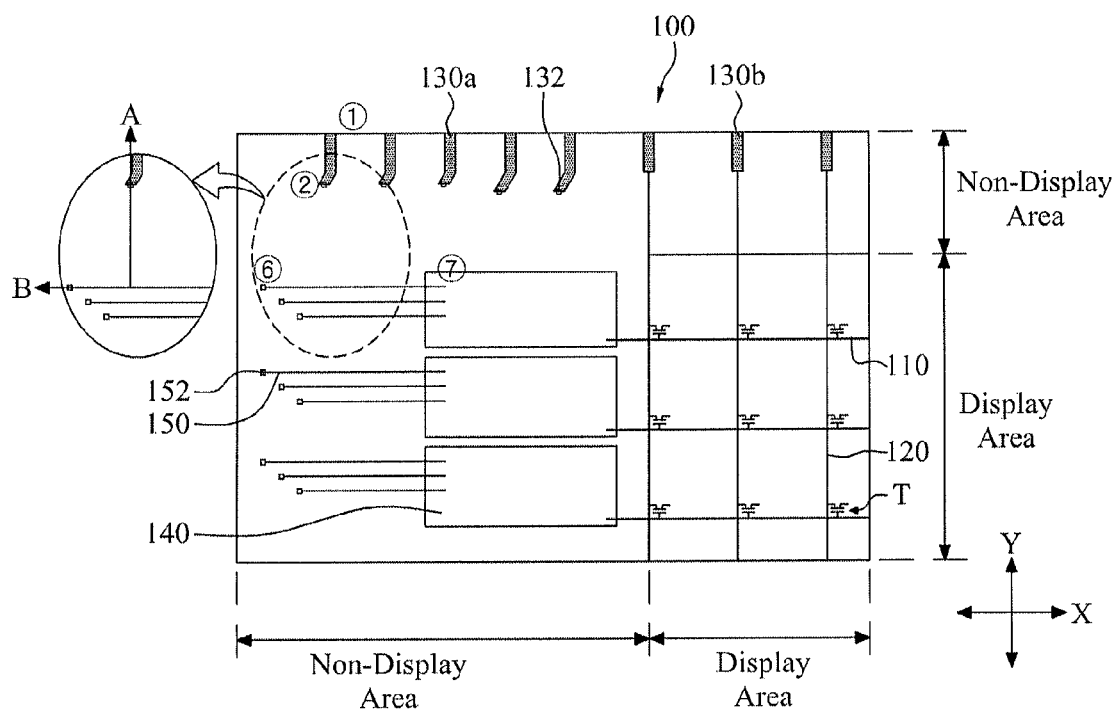
FIG. 3A is a plan view illustrating a first substrate of an LCD device according to an embodiment of the present invention.
Figure 3B:
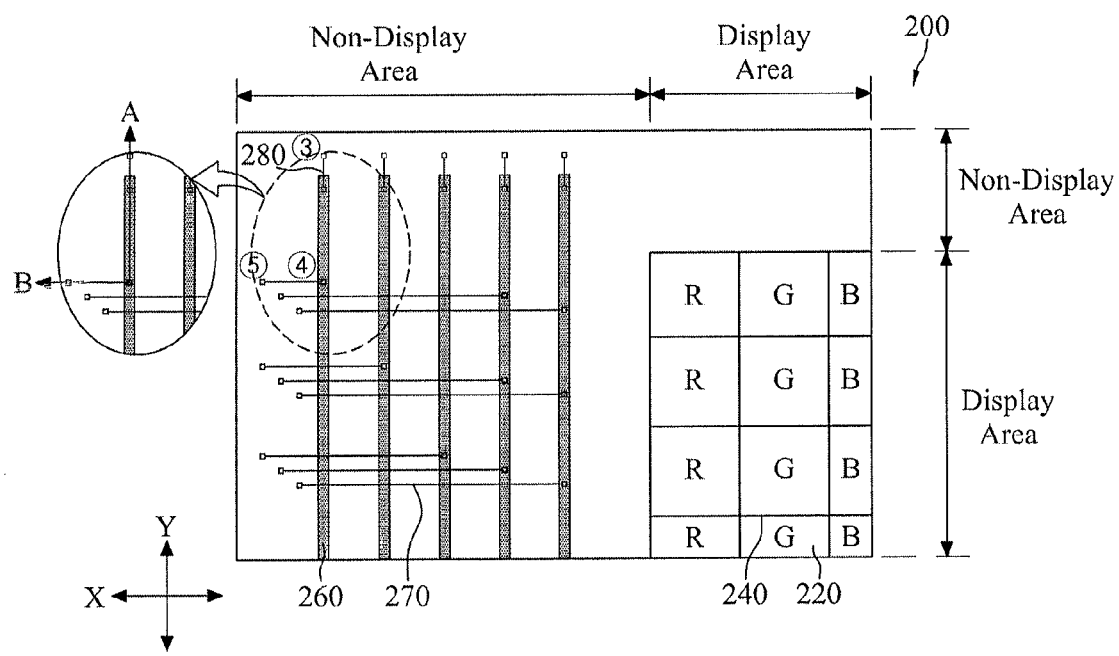
FIG. 3B is a plan view illustrating a second substrate of an LCD device according to an embodiment of the present invention.
Figure 3C:
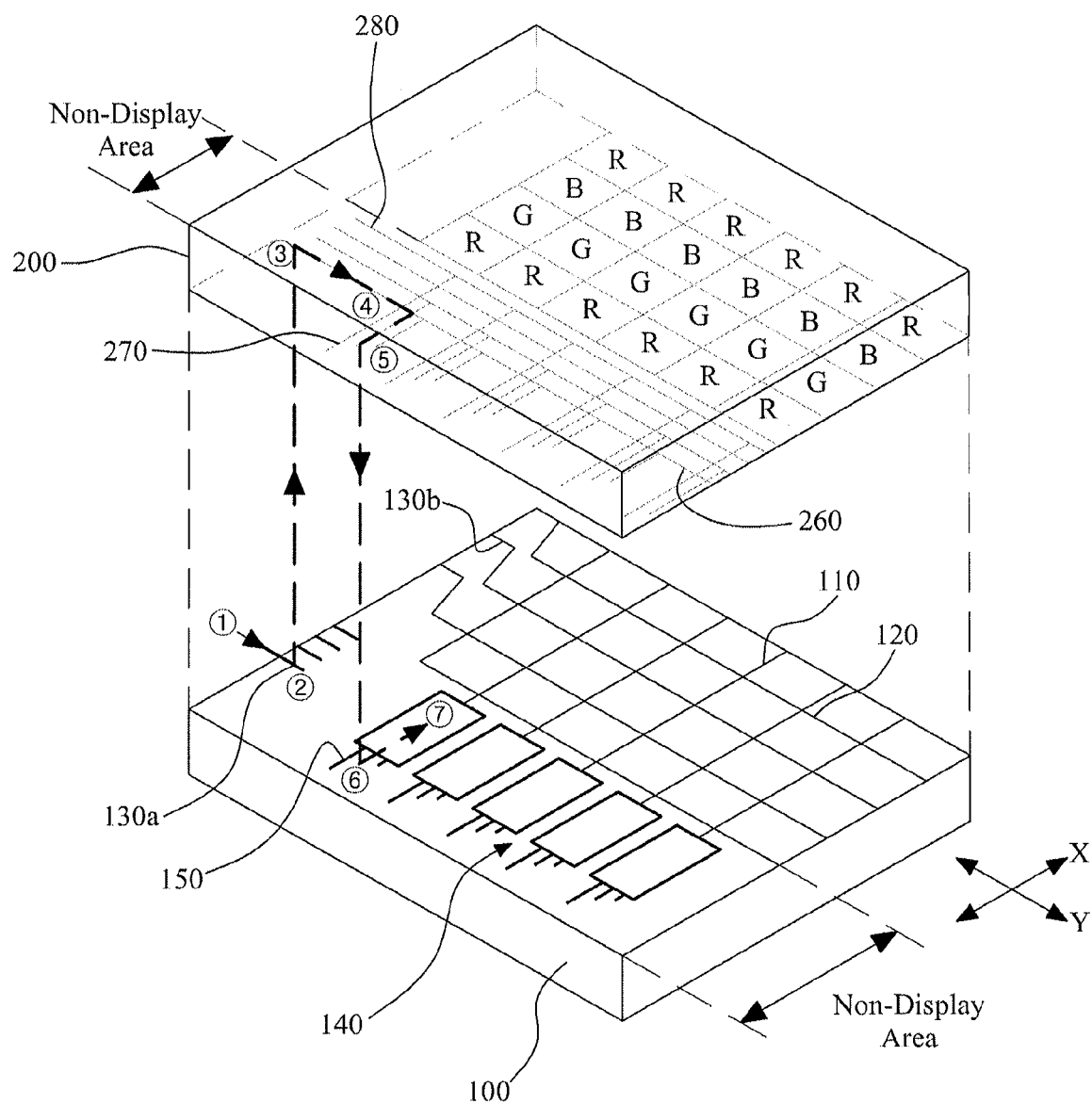
FIG. 3C is a perspective view illustrating the first and second substrates of the LCD device shown in FIG. 3A and FIG. 3B.

FIG. 3A is a plan view illustrating a first substrate of an LCD device according to an embodiment of the present invention. FIG. 3B is a plan view illustrating a second substrate of an LCD device according to an embodiment of the present invention. FIG. 3C is a perspective view illustrating the first and second substrates of the LCD device shown in FIG. 3A and FIG. 3B.

As seen in FIG. 3A, the first substrate 100 includes a display area that displays an image and a non-display area that cannot display an image.

In the display area, a plurality of gate lines 110 and data lines 120 are intersected and formed, thereby defining a plurality of pixels. A thin film transistor T as a switching element is formed in each of the pixels. The gate lines 110, the data lines 120, and the thin film transistors T may be changed to various shapes as known to those skilled in the art. For example, unlike the illustrated in FIG. 3A, the data lines 120 may not be formed in a straight-line shape, or may be formed in a curve-line shape.

To supply signals to the display area, pads 130a and 130b, a GIP circuit block 140, and a connection line 150 are formed in the non-display area.

The pads 130a and 130b are formed at one side end portion of the first substrate 100, and a driver (not shown) is connected to the pads 130a and 130b.

The pad 130a is a gate pad 130a for applying a signal to the gate line 110, and the pad 130b is a data pad 130b for applying a signal to the data line 110.

The data pad 130b is directly connected to the data line 120, but the gate pad 130a is connected to the gate line 110 via various elements. Particularly, in an embodiment of the present invention, an electrical connection between the gate pad 130a and the gate line 110 is formed using an element that is formed at the below-described second substrate 200, and thus, the size of the non-display area of the LCD device is reduced. That is, as described below, a plurality of signal lines for supplying signals to the gate lines 110 (which are formed on the first substrate 100) are formed on the second substrate 200 where the gate lines 110 are not formed, thus decreasing the size of the non-display area of the LCD device.

A pad electrode 132 is formed at one end portion of the gate pad 130a the pad electrode 132 is connected to the gate pad 130a through a contact hole. The pad electrode 132 is exposed to the outside, and thus enables the gate pad 130a to be easily connected to the below-described signal line (see reference numeral 260 of FIG. 3B). The number and arrangement type of the gate pads 130a may be changed variously according to the kind of an applied signal.

A plurality of the GIP circuit blocks 140 are respectively disposed near the plurality of pixels, and each of the GIP circuit blocks 140 is connected to a corresponding gate line 110.

The GIP circuit block 140 is configured in a connection structure of a plurality of transistors, and the detailed configuration of the GIP circuit block 140 may be changed to various structures as known to those skilled in the art.

The connection line 150 is connected to the GIP circuit block 140. A connection electrode 152 is formed at one end portion of the connection line 150. The connection electrode is connected to the connection line 150 through a contact hole. The connection electrode 152 is exposed to the outside, and thus enables the connection line 150 to be easily connected to the below-described signal line (see reference numeral 260 of FIG. 3B). The number and arrangement type of the connection lines 150 may be changed variously according to the kind of an applied signal.

In FIG. 3A, the pad electrode 132 formed at one end portion of the gate pad 130a is not connected to the connection electrode 152 formed at one end portion of the connection line 150, but an electrical connection between the pad electrode 132 and the connection electrode 152 may be realized by a structure that is formed on the below-described second substrate 200.

As seen in FIG. 3B, the substrate 200 includes a display area that displays an image and a non-display area that cannot display an image.

Red (R), green (G), and blue (B) color filters 220 are formed in the display area. The color filters 220 are divided by a black matrix 240. The kind and arrangement type of the black matrixes 240 may be variously changed as known to those skilled in the art.

A plurality of signal lines 160, first bridges 270, and second bridges 280 are formed in the non-display area.

Although not shown for convenience, a black matrix is entirely formed in the non-display area, thereby preventing the leakage of light. The black matrix includes a contact hole such that an electrical connection is formed between elements. The entire structure of the black matrix can be more easily understood with reference the below-described sectional structure of the LCD device.

The signal line 260 is connected to the gate pad 130a of FIG. 3A. The number of signal lines 260 corresponds to the number of gate pads 130a. The signal lines 260 are arranged in the Y direction, and enable a gate signal to be applied to each of the gate lines 110.

The first bridge 270 connects the signal line 260 to the connection line 150 of FIG. 3A. That is, one end of the first bridge 270 is connected to the signal line 260, and the other end of the first bridge 270 is connected to the connection electrode 152. Accordingly, the signal line 260 is connected to the connection line 150 via the first bridge 270 and the connection electrode 152.

The second bridge 280 connects the signal line 260 to the gate pad 130a of FIG. 3A. That is, one end of the second bridge 280 is connected to the signal line 260, and the other end of the second bridge 280 is connected to the pad electrode 132. Accordingly, the gate pad 130a is connected to the signal line 260 via the pad electrode 132 and the second bridge 280.

Therefore, as illustrated as combi-numerals in FIGS. 3A-3C, the gate pad 130a is connected to the GIP circuit block 140 sequentially via the pad electrode 132, the second bridge 280, the signal line 260, the first bridge 270, the connection electrode 152, and the connection line 150, and thus, a signal is transferred in the order of ①→②→③→④→⑤→⑥→⑦.

The electrical connection between the elements can be more easily understood with reference to the below-described sectional structure of the LCD device according to various embodiments of the present invention.

Figure 4:
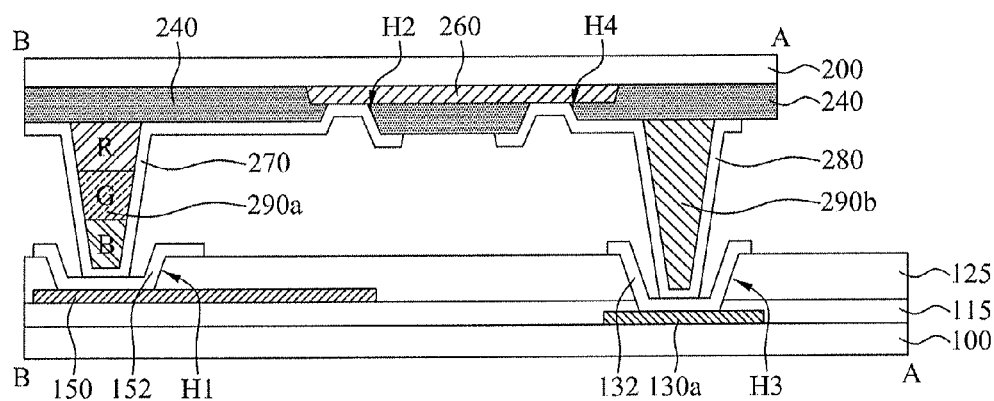
FIG. 4 is a sectional view illustrating an LCD device according to an embodiment of the present invention, and corresponds to line A-B of FIGS. 3A and 3B.

FIG. 4 is a sectional view illustrating an LCD device according to an embodiment of the present invention, and corresponds to line A-B of FIGS. 3A and 3B.

As seen in FIG. 4, the LCD device according to an embodiment of the present invention includes a first substrate 100 and a second substrate 200 that face each other. Although not shown, a liquid crystal layer is formed between the first substrate 100 and the second substrate 200, more specifically, between the two substrates 100 and 200 corresponding to the display area.

The first substrate 100 may configure a lower substrate of the LCD device, and may be referred to as a thin film transistor substrate because a thin film transistor is formed thereon.

A pad, more specifically, a gate pad 130a is formed on the first substrate 100. A gate insulation layer 115 is formed on the gate pad 130a.

A connection line 150 is formed on the gate insulation layer 115, and a passivation layer 125 is formed on the connection line 150. As illustrated, when the connection line 150 is formed on the gate insulation layer 115, the connection line 150 and a data line may be formed of the same material and on the same layer, through the same process. However, the connection line 150 needs not necessarily be formed on gate insulation layer 115, and depending on the case, the connection line 150 and the gate pad 130a may be formed of the same material and on the same layer, through the same process.

A connection electrode 152 and a pad electrode 132 are formed on the passivation layer 125.

The connection electrode 152 is connected to the connection line 150. For this end, a first contact hole H1 is formed in the passivation layer 125 to expose the connection line 150, and the connection electrode 152 is connected to the connection line 150 through the first contact hole H1.

The pad electrode 132 is connected to the gate pad 130a. For this end, a third contact hole H3 is formed in each of the gate insulation layer 115 and passivation layer 125 to expose the gate pad 130a, and the pad electrode 132 is connected to the gate pad 130a through the third contact hole H3.

The second substrate 200 may configure an upper substrate of the LCD device, and may be referred to as a color filter substrate because a color filter is formed thereon. However, depending on the case, the color filter may be formed on the first substrate 110 that is the lower substrate.

A signal line 260 is formed on the second substrate 200, and a black matrix 240 is formed on the single line 260.

A first bridge 270 and a second bridge 280 are formed on the black matrix 240.

One end of the first bridge 270 is connected to the signal line 260. For this end, a second contact hole H2 is formed in the black matrix 240 to expose the signal line 260, and the first bridge 270 is connected to the signal line 260 through the second contact hole H2.

The other end of the first bridge 270 is connected to the connection electrode 152. For this end, a first protrusion 290a is formed between the black matrix 240 and the first bridge 270.

The first protrusion 290a is formed to have a height similar to a cell gap in the LCD device, and thus enables the first bridge 270 (which is formed on the second substrate 200) to be connected to the connection electrode 152 that is formed on the first substrate 100.

The first protrusion 290a may be formed with the combination of red (R), green (G), and blue (B) color filters. When the height of the cell gap is small, the first protrusion 290a may be formed with the combination of two color filters having different colors. Also, the first protrusion 290a may be formed as a column spacer for maintaining the cell gap in the LCD device. The first protrusion 290a is formed at a position corresponding to the first contact hole H1, and thus, the other end of the first bridge 270 is inserted into the first contact hole H1 and connected to the connection electrode 152.

One end of the second bridge 280 is connected to the signal line 260. For this end, a fourth contact hole H4 is formed in the black matrix 240 to expose the signal line 260, and the second bridge 280 is connected to the signal line 260 through the fourth contact hole H4.

The other end of the second bridge 280 is connected to the pad electrode 132. For this end, a second protrusion 290b is formed between the black matrix 240 and the second bridge 280.

The second protrusion 290b, similarly to the above-described first protrusion 290a, is formed as a color filter or a column spacer. The second protrusion 290b is formed at a position corresponding to the third contact hole H3, and thus, the other end of the second bridge 280 is inserted into the third contact hole H3 and connected to the pad electrode 132.

Throughout the specification, the above mentioned one end and the other end of a bridge should be construed as including both a distal end of an element and a position near the distal end.

As described above, the gate pad 130a formed on the first substrate 100 is connected to the connection line 150 that are formed on the first substrate 100, through the elements formed on the second substrate 200.

In more detail, the gate pad 130a formed on the first substrate 100 is connected to the pad electrode 132, the pad electrode 132 is connected to the second bridge 280 formed on the second substrate 200, the second bridge 280 is connected to the signal line 260, the signal line 260 is connected to the first bridge 270, the first bridge 270 is connected to the connection electrode 152 formed on the first substrate 100, and the connection electrode 152 is connected to the connection line 150.

Figure 5:
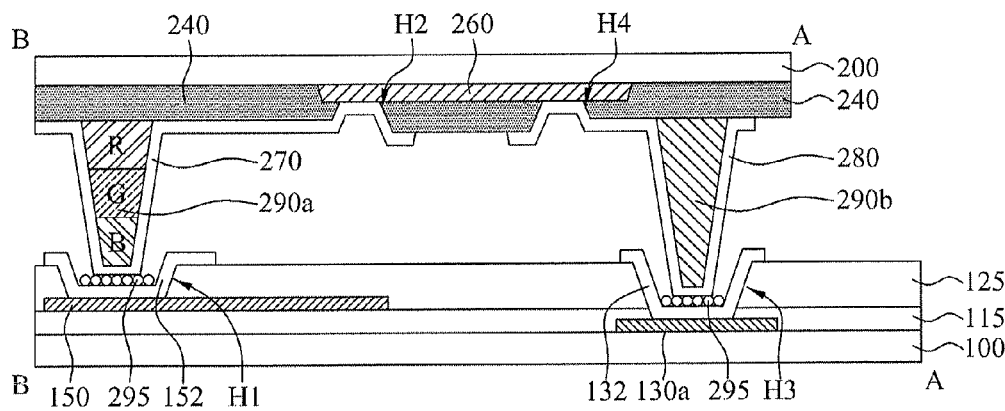
FIG. 5 is a sectional view illustrating an LCD device according to another embodiment of the present invention, and corresponds to line A-B of FIGS. 3A and 3B.

FIG. 5 is a sectional view illustrating an LCD device according to another embodiment of the present invention, and corresponds to line A-B of FIGS. 3A and 3B. Except that a conductive ball 295 is additionally formed, the LCD device of FIG. 5 is identical to the LCD device of FIG. 4. Therefore, like elements are respectively indicated by like reference numerals, and a repetitive description on the same element is not provided.

According to FIG. 5, a conductive ball 295 is additionally formed between the first bridge 270 and the connection electrode 152, and thus, electrical connection characteristic between the first bridge 270 and the connection electrode 152 can be enhanced. Also, a conductive ball 295 is additionally formed even between the second bridge 280 and the pad electrode 132, and thus, electrical connection characteristic between the second bridge 280 and the pad electrode 132 can be enhanced.

The conductive ball 295 may have a core/shell structure that is formed with the combination of a core (which is formed of elastic plastic or silica) and a shell that is formed of metal having excellent conductivity such as Al, Ni, Au, or Ag, or a metal alloy.

The conductive ball 295 may be formed only between the first bridge 270 and the connection electrode 152 or between the second bridge 280 and the pad electrode 132.

Figure 6:
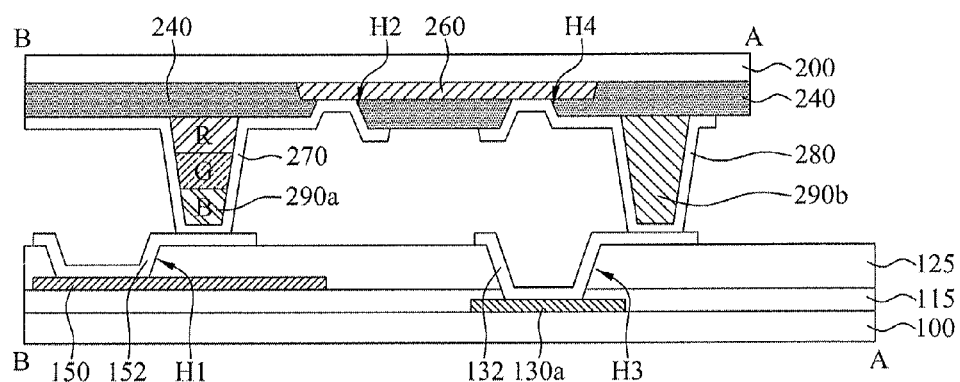
FIG. 6 is a sectional view illustrating an LCD device according to another embodiment of the present invention, and corresponds to line A-B of FIGS. 3A and 3B.

FIG. 6 is a sectional view illustrating an LCD device according to another embodiment of the present invention, and corresponds to line A-B of FIGS. 3A and 3B. Except that the position of the first protrusion 290a and the position of the second protrusion 290b have been changed, the LCD device of FIG. 6 is identical to the LCD device of FIG. 4. Therefore, like elements are respectively indicated by like reference numerals, and a repetitive description on the same element is not provided.

According to FIG. 4, the first protrusion 290a is formed at a position corresponding to the first contact hole H1, and thus, the other end of the first bridge 270 is inserted into the first contact hole H1 and connected to the connection electrode 152. On the contrary, according to FIG. 6, the first protrusion 290a is formed at a position that does not correspond to the first contact hole H1, and thus, the other end of the first bridge 270 is connected to the connection electrode 152 without being inserted into the first contact hole H1.

According to FIG. 4, moreover, the second protrusion 290b is formed at a position corresponding to the third contact hole H3, and thus, the other end of the second bridge 280 is inserted into the third contact hole H3 and connected to the pad electrode 132. On the contrary, according to FIG. 6, the second protrusion 290b is formed at a position that does not correspond to the third contact hole H3, and thus, the other end of the second bridge 280 is connected to the pad electrode 132 without being inserted into the third contact hole H3.

When misalignment occurs in a coupling process between the first substrate 100 and the second substrate 200, in the structure of FIG. 4, the first bridge 270/second bridge 280 may not be inserted into the first contact hole H1/second contact hole H2. Therefore, when a contact area for an electrical connection increases by applying the structure of FIG. 6, for example, when the sectional area of the first protrusion 290a and the sectional area of the second protrusion 290b increase, electrical connection characteristic can be enhanced even when misalignment occurs.

Alternatively, the first protrusion 290a may be formed at a position that does not correspond to the first contact hole H1, and the second protrusion 290b may be formed at a position that corresponds to the third contact hole H3. Also, the first protrusion 290a may be formed at a position that corresponds to the first contact hole H1, and the second protrusion 290b may be formed at a position that does not correspond to the third contact hole H3.

Figure 7:
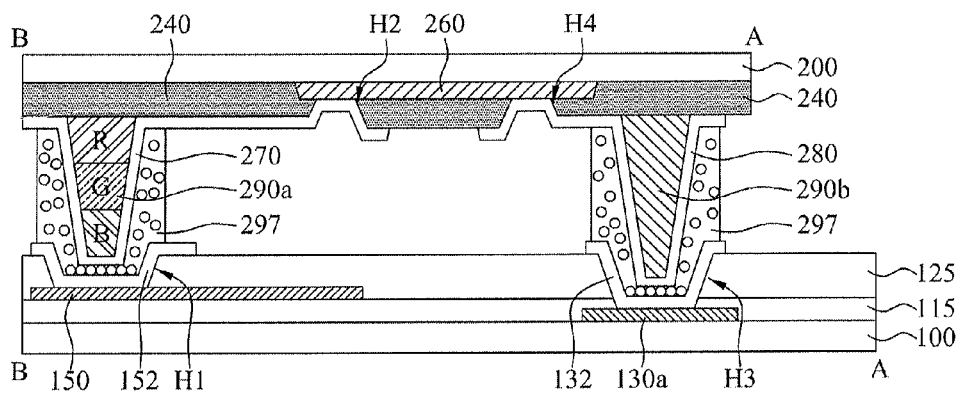
FIG. 7 is a sectional view illustrating an LCD device according to another embodiment of the present invention, and corresponds to line A-B of FIGS. 3A and 3B.

FIG. 7 is a sectional view illustrating an LCD device according to another embodiment of the present invention, and corresponds to line A-B of FIGS. 3A and 3B. Except that an Anisotropic Conductive Film (ACF) is additionally formed, the LCD device of FIG. 7 is identical to the LCD device of FIG. 4. Therefore, like elements are respectively indicated by like reference numerals, and a repetitive description on the same element is not provided.

According to FIG. 7, an ACF 297 is additionally formed between the first bridge 270 and the connection electrode 152, and thus, electrical connection characteristic can be enhanced between the first bridge 270 and the connection electrode 152. Also, an ACF 297 is additionally formed even between the second bridge 280 and the pad electrode 132, and thus, electrical connection characteristic can be enhanced between the second bridge 280 and the pad electrode 132.

The ACF 297 is a film that electrically connects and couples a Chip On Film (COF) and a pad part of a Thin Film Transistor (TFT) substrate optionally and is known to those skilled in the art. By applying the ACF 297, electrical connection characteristic can be enhanced between the bridges 270 and 280 and the electrodes 152 and 132.

Alternatively, the ACF 297 may be formed only between the first bridge 270 and the connection electrode 152 or between the second bridge 280 and the pad electrode 132.

Although not shown, an adhesive member (for example, a conductive sealant) including a conductive material that enhances an electrical connection may be applied instead of the ACF 297.

Figure 8A:
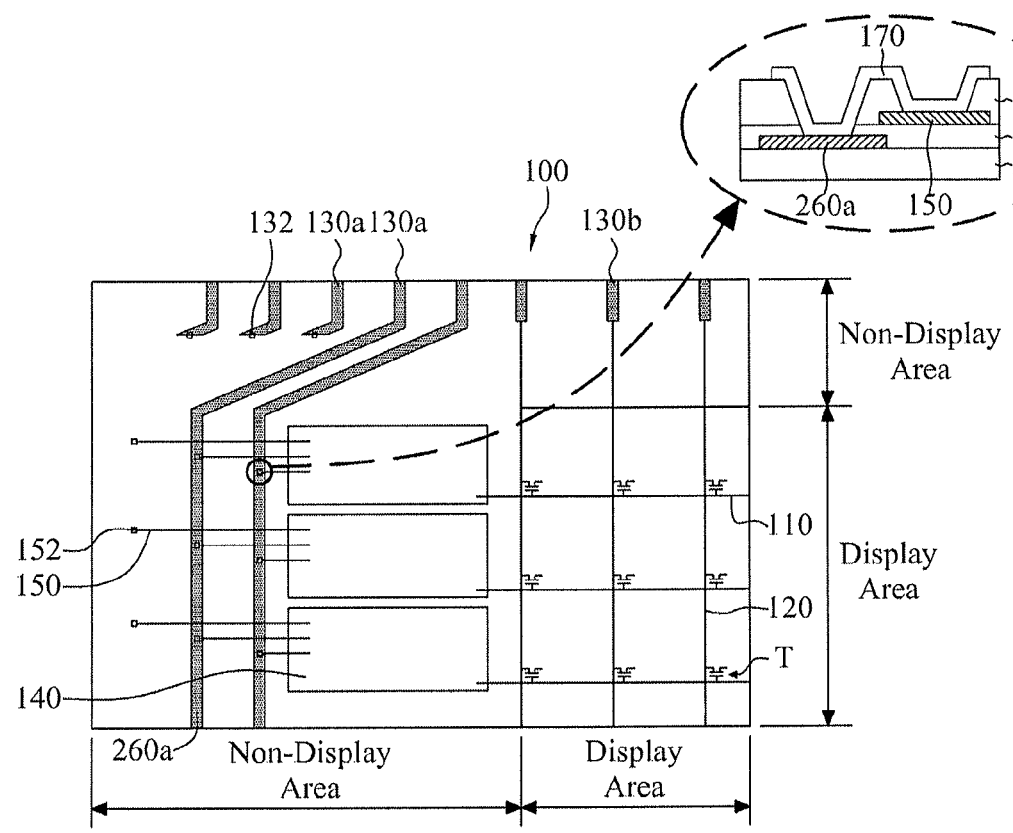
FIG. 8A is a plan view illustrating a first substrate of an LCD device according to another embodiment of the present invention.
Figure 8B:
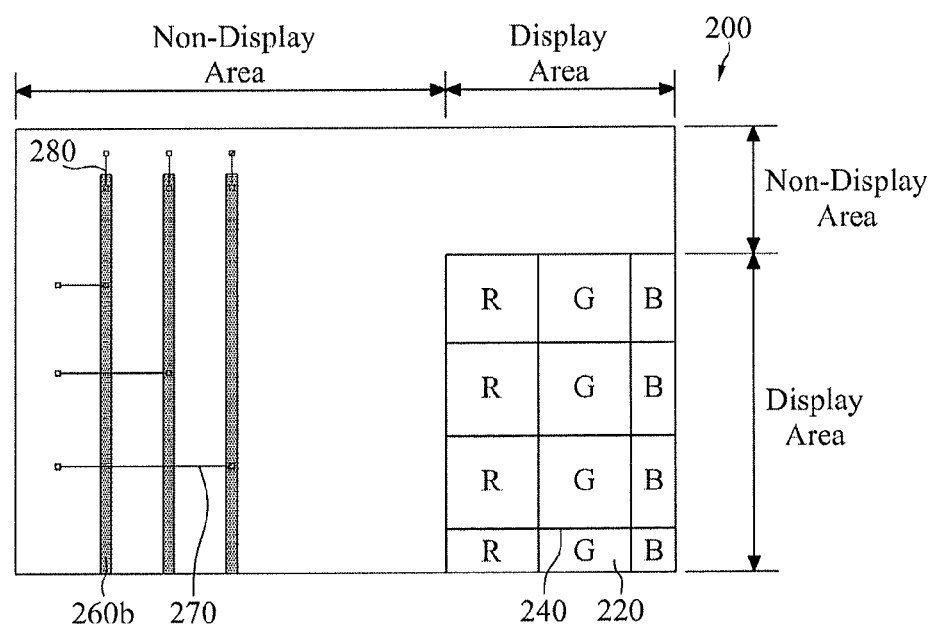
FIG. 8B is a plan view illustrating a second substrate of an LCD device according to another embodiment of the present invention.

FIG. 8A is a plan view illustrating a first substrate of an LCD device according to another embodiment of the present invention. FIG. 8B is a plan view illustrating a second substrate of an LCD device according to another embodiment of the present invention.

Except that a plurality of signal lines 260 are respectively formed at both a first substrate 100 and a second substrate 200, the LCD device of FIG. 8 is identical to the LCD device of FIG. 3. Therefore, the following description will be made on different elements.

As seen in FIG. 8A, a gate pad 130a, a data pad 130b, a GIP circuit block 140, and a connection line 150 are formed in a non-display area of the first substrate 100, and a first signal line 260a is additionally formed in the non-display area.

The first signal line 260a is connected to some of a plurality of the gate pads 130a. In this case, the connected first signal line 260a and gate pad 130a are formed as one body, and thus may be formed of the same material and on the same layer, through the same process.

To prevent the enlargement of the non-display area, in this way, the first signal line 260a formed on the first substrate 100 may include a plurality of lines having a relatively narrow width, for example, a plurality of lines which apply a common signal to all gate lines as in lines that apply a power source signal.

Moreover, some of the connection lines 150 are connected to the first signal line 260a. Referring to an enlarged view of FIG. 8A, the first signal line 260a is formed on the substrate 100, a gate insulation layer 115 is formed on the first signal line 260a, a connection line 150 is formed on the gate insulation layer 125, and a passivation layer 125 is formed on the connection line 150. Also, an electrical connection between the first signal line 260a and the connection line 150 may be formed using a fourth bridge 170 that is formed on the passivation layer 125.

As seen in FIG. 8B, a second signal line 260b, a first bridge 270, and a second bridge 280 are formed in a non-display area of the second substrate 200.

The second signal line 260b is connected to the other gate pads of the plurality of the gate pads 130a, in which case a connection structure is the same as that of the LCD device of FIG. 3.

According to the LCD device of FIG. 8A, therefore, some of the plurality of gate pads 130a formed on the first substrate 100 are connected to the GIP circuit block 140 sequentially via the first signal line 260a, the fourth bridge 170, and the connection line 150.

Moreover, the other gate pads of the plurality of gate pads 130a formed on the first substrate 100 are connected to the GIP circuit block 140 sequentially via the pad electrode 132, the second bridge 280, the second signal line 260b, the first bridge 270, the connection electrode 152, and the connection line 150, identically to the above-described LCD device of FIG. 3.

Figure 9A:
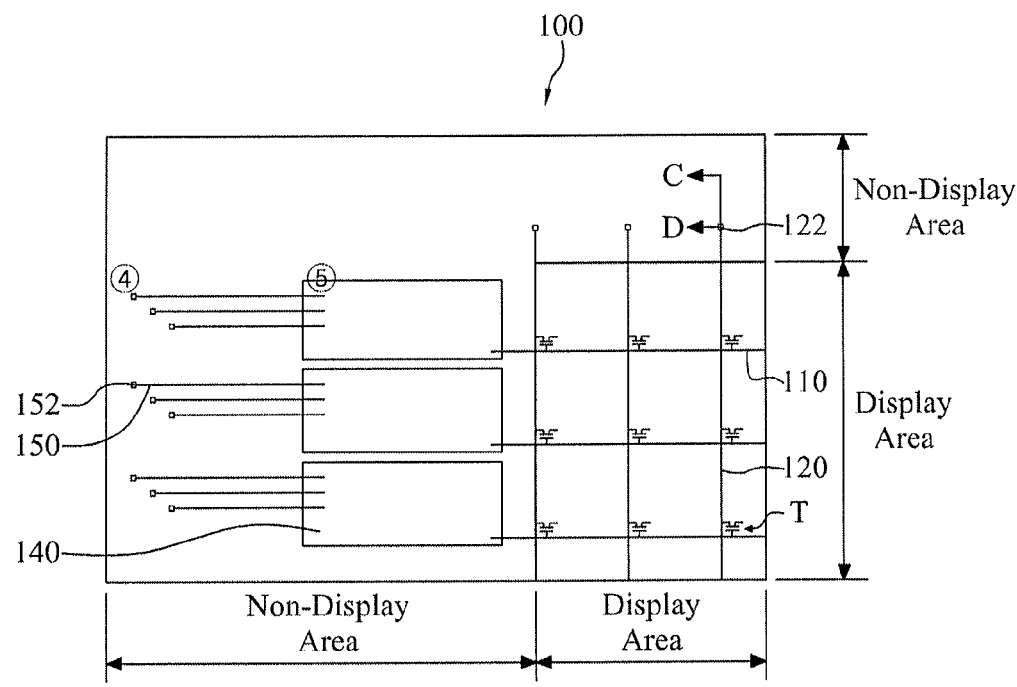
FIG. 9A is a plan view illustrating a first substrate of an LCD device according to another embodiment of the present invention.
Figure 9B:
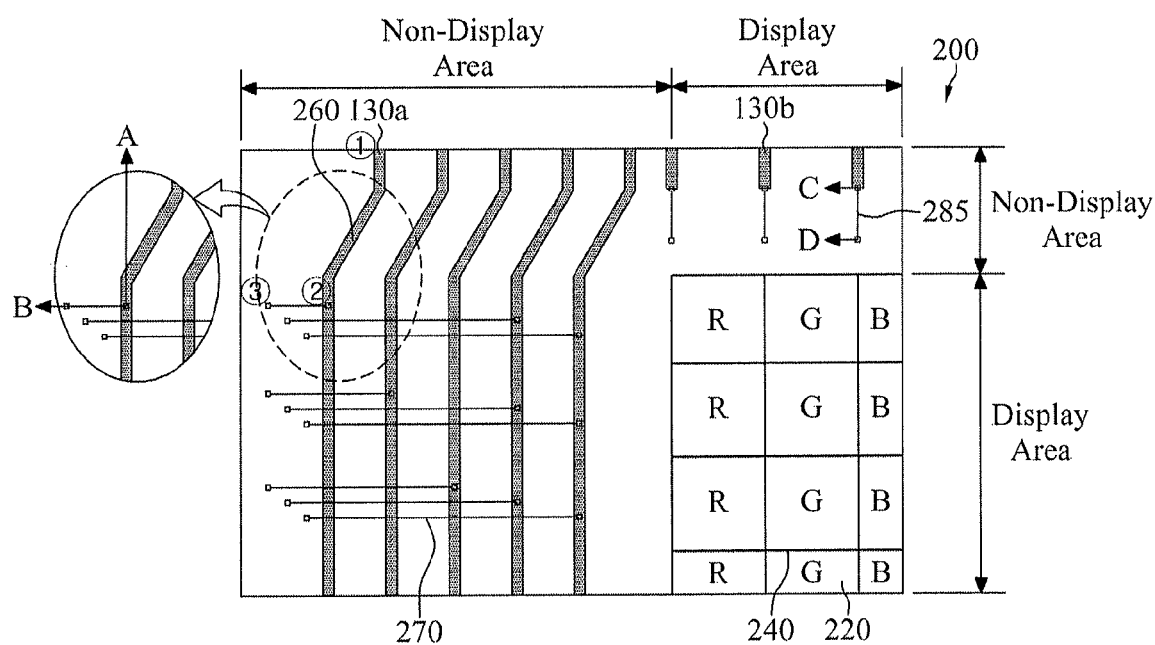
FIG. 9B is a plan view illustrating a second substrate of an LCD device according to another embodiment of the present invention.

FIG. 9A is a plan view illustrating a first substrate of an LCD device according to another embodiment of the present invention. FIG. 9B is a plan view illustrating a second substrate of an LCD device according to another embodiment of the present invention.

The LCD device of FIGS. 9A and 9B differs from the LCD device of FIG. 3 in that pads 130a and 130b are formed at a second substrate 200 with color filters formed thereon instead of a first substrate 100 with thin film transistors T formed thereon. A detailed description on the same element is not provided.

As seen in FIG. 9A, a GIP circuit block 140 and a connection line 150 are formed in a non-display area of the first substrate 100, and a connection electrode 152 is connected to the connection line 150.

Moreover, a data electrode 122 is connected to one end of the data line 120.

As seen in FIG. 9B, a gate pad 130a, a data pad 130b, a signal line 260, a first bridge 270, and a third bridge 285 are formed in a non-display area of the second substrate 200.

The gate pad 130a is connected to the signal line 260. In this case, the gate pad 130a and the signal line 260 are formed as one body, and thus formed of the same material and on the same layer, through the same process.

The first bridge 270 connects the signal line 260 to the connection line 150 that is formed on the first substrate 100. That is, one end of the first bridge 270 is connected to the signal line 260, and the other end of the first bridge 270 is connected to the connection electrode 152. Accordingly, the signal line 260 is connected to the connection line 150 via the first bridge 270 and the connection electrode 152.

Therefore, as illustrated as combi-numerals in FIGS. 9A and 9B, the gate pad 130a is connected to the GIP circuit block 140 sequentially via the signal line 200, the first bridge 270, the connection electrode 152, and the connection line 150, and thus, a signal is transferred in the order of ①→②→③→④→⑤.

The third bridge 285 connects the data pad 130b to the data line 120 that is formed on the first substrate 100. That is, one end of the third bridge 285 is connected to the data pad 130b, and the other end of the third bridge 285 is connected to the data electrode 122.

As a result, the data pad 130b is connected to the data line 120 via the third bridge 285 and the data electrode 122.

Figure 10:
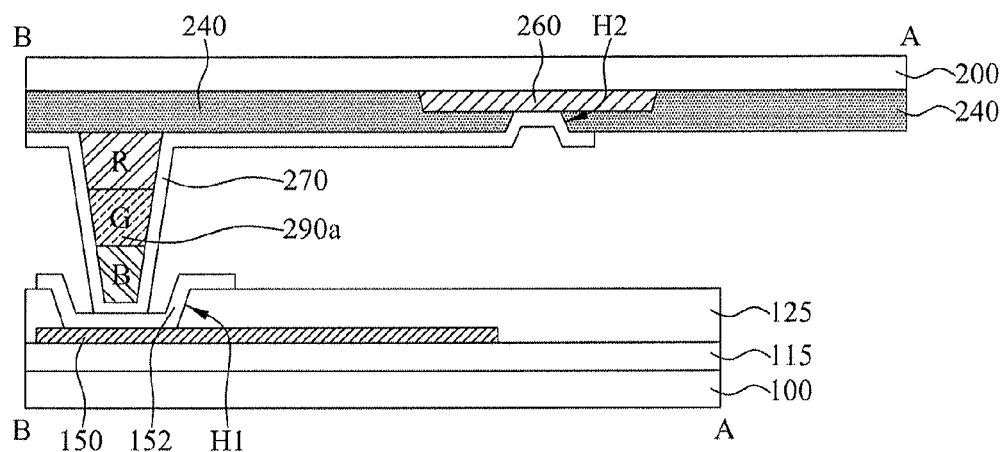
FIG. 10 is a sectional view illustrating an LCD device according to another embodiment of the present invention, and corresponds to line A-B of FIGS. 9A and 9B.

FIG. 10 is a sectional view illustrating an LCD device according to another embodiment of the present invention, and corresponds to line A-B of FIGS. 9A and 9B.

As seen in FIG. 10, the LCD device according to another embodiment of the present invention includes a first substrate 100 and a second substrate 200 that face each other.

A gate insulation layer 115 is formed on the first substrate 100, and a connection line 150 is formed on the gate insulation layer 115.

A passivation layer 125 is formed on the connection line 150, and a connection electrode 152 is formed on the passivation layer 125. The connection electrode 152 is connected to the connection line 150 through a first contact hole H1 that is formed in the passivation layer 125.

A signal line 260 is formed on the second substrate 200, and a black matrix 240 is formed on the signal line 260.

A first bridge 270 is formed on the black matrix 240.

One end of the first bridge 270 is connected to the signal line 260 through a second contact hole H2 that is formed in the black matrix 240, and the other end of the first bridge 270 is connected to the connection electrode 152 by a first protrusion 290a that is formed on the black matrix 240.

An electrical connection structure (using the first bridge 270) between the signal line 260 and the connection line 152 may be variously changed as in FIGS. 5 to 7.

Figure 11:
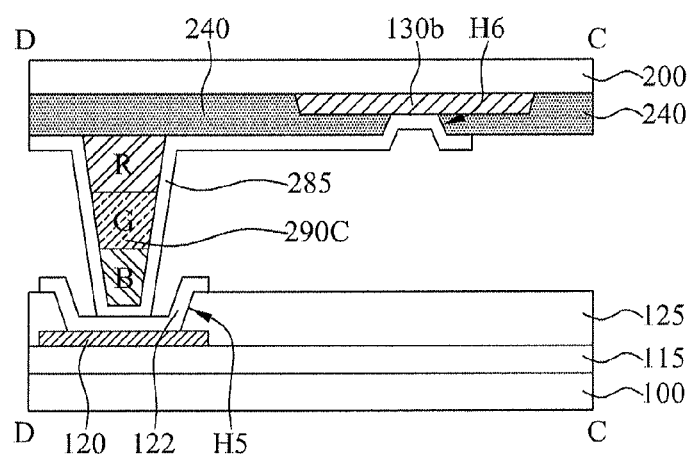
FIG. 11 is a sectional view illustrating an LCD device according to another embodiment of the present invention, and corresponds to line C-D of FIGS. 9A and 9B.

FIG. 11 is a sectional view illustrating an LCD device according to another embodiment of the present invention, and corresponds to line C-D of FIGS. 9A and 9B.

As seen in FIG. 11, a gate insulation layer 115 is formed on the first substrate 100, and a data line 120 is formed on the gate insulation layer 115.

A passivation layer 125 is formed on the data line 150, and a data electrode 122 is formed on the passivation layer 125. The data electrode 122 is connected to the data line 120 through a fifth contact hole H5 that is formed in the passivation layer 125.

A data pad 130b is formed on the second substrate 200, and a black matrix 240 is formed on the data pad 130b.

A third bridge 285 is formed on the black matrix 240.

One end of the third bridge 285 is connected to the data pad 130b through a sixth contact hole H6 that is formed in the black matrix 240, and the other end of the third bridge 285 is connected to the data electrode 122 by a third protrusion 290c that is formed on the black matrix 240. The material of the third protrusion 290c is the same as that of the first and second protrusions 290a and 290b, and thus, its detailed description is not provided.

An electrical connection structure (using the third bridge 285) between the data pad 130b and the data line 120 may be variously changed as in the electrical connection structures of FIGS. 5 to 7.

The embodiments have been described on the GIP type LCD device, but are not limited to the GIP type LCD device.

FIGS. 12A, 12B, 13A and 13B are sectional views schematically illustrating an LCD device according to another embodiment of the present invention, and illustrates a structure where a driver 400 is additionally provided to a coupled substrate with the first and second substrates 100 and 200 according to the above-described embodiments.

Figure 12A:
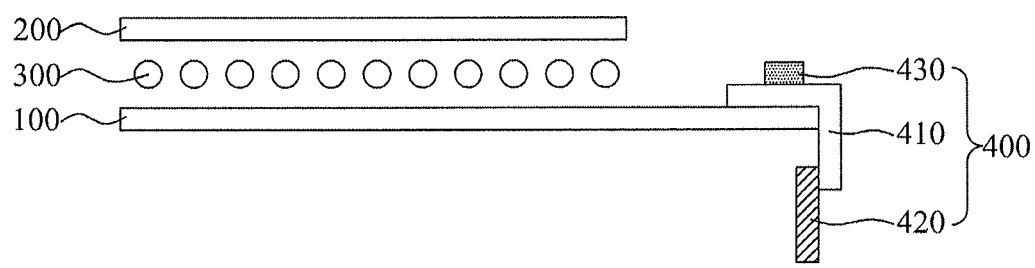
FIGS. 12 and 13 are sectional views schematically illustrating an LCD device according to another embodiment of the present invention, and illustrate structures where a driver is additionally provided to a coupled substrate according to various embodiments.
Figure 12B:
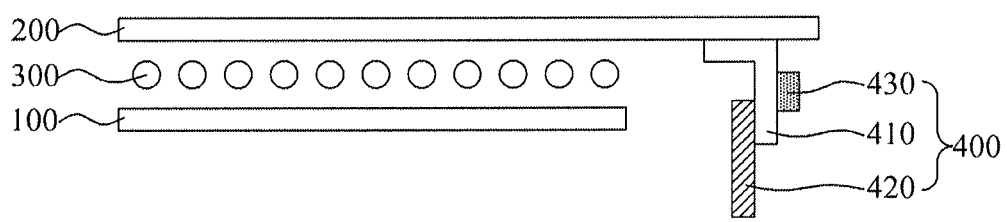

As seen in FIGS. 12A and 12B, the LCD device according to another embodiment of the present invention includes a first substrate 100, a second substrate 200, a liquid crystal layer 300, and a driver 400.

The first substrate 100 configures a lower substrate of the LCD device, and is a thin film transistor substrate with thin film transistors T formed thereon. The first substrate 100 may be variously changed as in the above-described embodiments.

The second substrate 200 configures an upper substrate of the LCD device, and is a color filter substrate with color filters formed thereon. The second substrate 200 may be variously changed as in the above-described embodiments.

The liquid crystal layer 300 is formed between the first substrate 100 and the second substrate 200.

The driver 400 applies signals to a plurality of gate lines and data lines formed on the first substrate 100 that is the thin film transistor substrate. The driver 400 includes a circuit film 410, a PCB 420, and a driving chip 430.

The circuit film 410 is adhered to the first substrate 100 or the second substrate 200. The PCB 420 applies various signals to the gate lines and the data lines through the circuit film 410, respectively. For this end, a timing controller, various power source circuits, and a memory are mounted on the PCB 420. The driving chip 430 is formed on the circuit film 410.

The driver 400, particularly, the circuit film 410 is connected to a gate pad and a data pad. FIG. 12A, the circuit film 410 is adhered to the first substrate 100. Therefore, an embodiment where the gate pad and the data pad are formed on the first substrate 100, namely, the above-described embodiment of FIGS. 3A, 3B, 8A, and 8B is applied to the LCD device of FIG. 12A.

Moreover, in FIG. 12B, the circuit film 410 is connected to the second substrate 200. Therefore, an embodiment where the gate pad and the data pad are formed on the second substrate 100, namely, the above-described embodiment of FIG. 9A-9B is applied to the LCD device of FIG. 12B.

In the LCD device of FIG. 12A, since the driver 400 is adhered to a top of the first substrate 100 that is the lower substrate, the first substrate 100 that is the lower substrate is extended longer than the second substrate 200 that is the upper substrate, and thus, the driver 400 is exposed to a front surface of the LCD device. Accordingly, a separate external case is required to be formed on the top of the first substrate 100 (being the lower substrate) for covering the exposed driver 400.

On the contrary, in the LCD device of FIG. 12B, since the driver 400 is adhered to a bottom of the second substrate 200 that is the upper substrate, the second substrate 200 that is the upper substrate is extended longer than the first substrate 100 that is the lower substrate, and thus, the driver 400 is not exposed to the front surface of the LCD device. Accordingly, a separate external case is not required to be formed on the top of the first substrate 100 (being the upper substrate) for covering the exposed driver 400. As a result, the thickness of the LCD device is reduced, and moreover, the present invention can obtain an aesthetic design effect in that the front surface of the LCD device is shown as one structure.

Figure 13A:
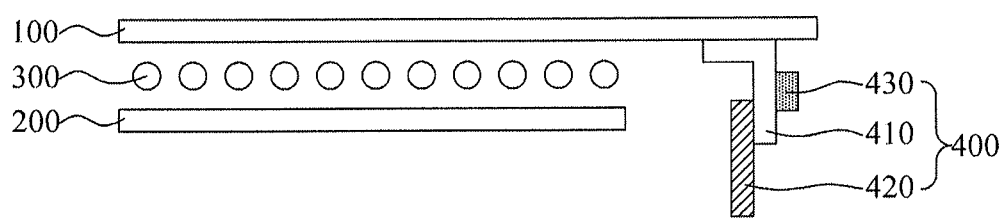
Figure 13B:
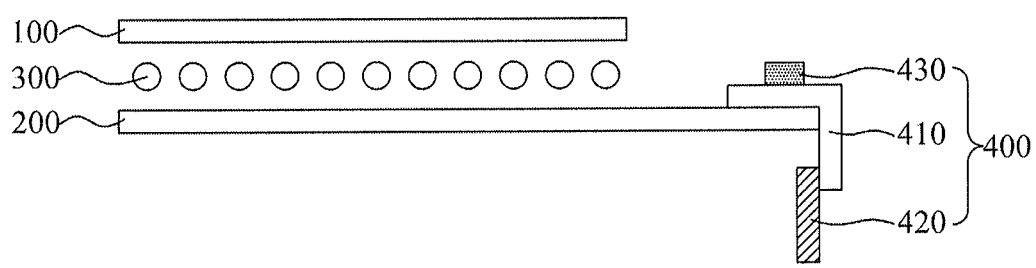

The LCD device of FIGS. 13A and 13B differs from the LCD device of FIGS. 12A and 12B in that the first substrate 100 is applied as the upper substrate and the second substrate 200 is applied as the lower substrate.

In FIG. 13A, the circuit film 410 is adhered to the first substrate 100. Therefore, an embodiment where the gate pad and the data pad are formed on the first substrate 100, namely, the above-described embodiment of FIGS. 3A, 3B, 8A, and 8B is applied to the LCD device of FIG. 13A, and particularly, the LCD device of FIG. 13A has a reverse structure of the LCD device of FIGS. 3 and 8.

Moreover, in FIG. 13B, the circuit film 410 is adhered to the second substrate 200. Therefore, an embodiment where the gate pad and the data pad are formed on the second substrate 200, namely, the above-described embodiment of FIG. 9A-9B is applied to the LCD device of FIG. 13B, and particularly, the LCD device of FIG. 13B has a reverse structure of the LCD device of FIG. 9A-9B.

Figure 14:
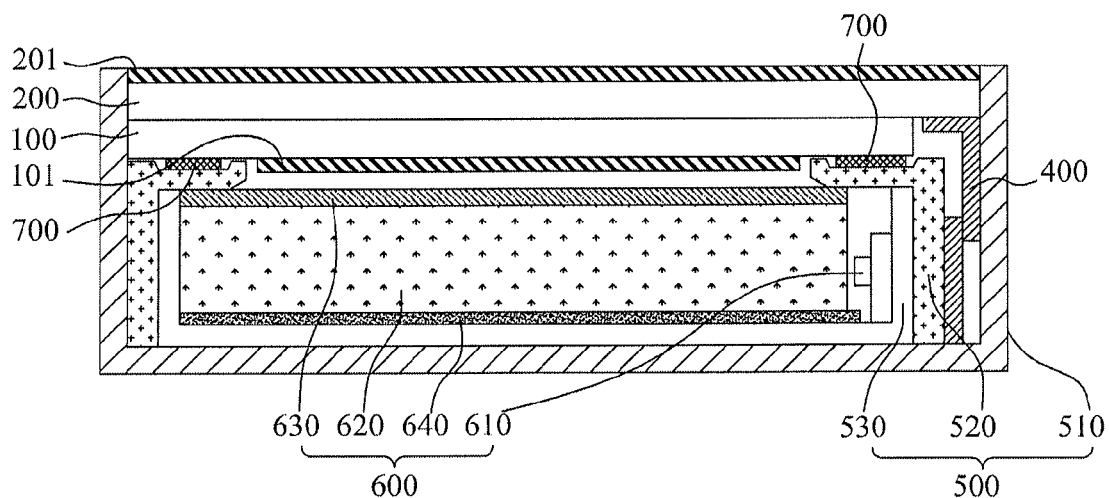
FIGS. 14 and 15 are sectional views schematically illustrating an LCD device according to another embodiment of the present invention, and illustrate structures where a backlight unit is additionally coupled to a coupled substrate according to various embodiments.
Figure 15:
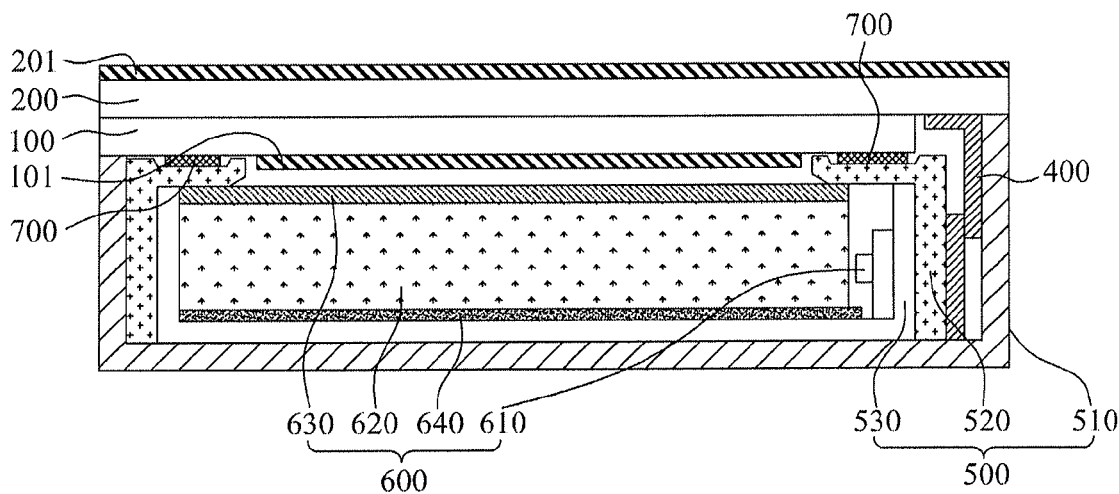

FIGS. 14 and 15 are sectional views schematically illustrating an LCD device according to another embodiment of the present invention, and illustrate structures where a backlight unit 600 is additionally coupled to a coupled substrate with the first and second substrates 100 and 200.

As seen in FIG. 14, the LCD device according to another embodiment of the present invention includes a first substrate 100, a second substrate 200, a driver 400, a support member 500, a backlight unit 600, and a coupling member 700.

The structure of each of the first substrate 100, second substrate 200, and driver 400 is illustrated identically to that of FIG. 12B, but may be implemented identically to that of FIG. 13B.

A first polarizer 101 is formed on a bottom of the first substrate 100, and a second polarizer 201 is formed on a top of the second substrate 200. A light transmittance is adjusted by the combination of the first and second polarizers 101 and 201, thereby displaying an image.

The support member 500 supports a coupled substrate with the first and second substrates 100 and 200, the driver 400, and the backlight unit 600, and acts as an external cover.

The support member 500 may include a set cover 510, a guide frame 520, and a support case 530.

The set cover 510 acts as an external cover of an LCD device such as a notebook computer, particularly, acts as a bottom cover and side cover of an LCD device. The set cover 510 is provided to contact a side surface of the coupled substrate with the first and second substrates 100 and 200, and thus configures the Bezel of the LCD device.

The guide frame 520 guides the position of the backlight unit 600 and supports the coupled substrates 100 and 200.

The support case 530 guides the position of the backlight unit 600 and supports the backlight unit 600. The support case 530, moreover, conformally transfers and dissipates heat that is generated in the backlight unit 600. That is, since heat is generated in the backlight unit 600, a heat dissipation instrument is required for dissipating the heat that is generated in the backlight unit 600. Accordingly, when the support case 530 is formed of a material such as metal enabling the conduction of heat, the heat generated in the backlight unit 600 is transferred through the support case 530 and thus dissipated to the outside. However, the support case 530 may not be provided depending on the case, in which case the backlight unit 600 may be supported by the above-described set cover 510.

The backlight unit 600 is disposed under the coupled substrates 100 and 200 and supplies light to the coupled substrates 100 and 200. The position of the backlight unit 600, as described above, is guided by the guide frame 520 and the support case 530.

The backlight unit 600 may be categorized into a direct type where at least one light source is disposed at an entire surface under the coupled substrates 100 and 200 and light emitted from the light source is irradiated onto the coupled substrates 100 and 200, and an edge type where at least one light source is disposed at one side under the coupled substrates 100 and 200 and light emitted from the light source is irradiated onto the coupled substrates 100 and 200 through a light guide panel. The direct type or the edge type may be applied to the present invention. That is, the edge type backlight unit 600 is illustrated in the drawings, but the present invention is not limited thereto.

The backlight unit 600 includes a light source 610, a light guide panel 620, an optical sheet 630, and a reflector 640.

The light source 610 is disposed to face a side surface of the light guide panel 620. Light emitted from the light source 610 is incident on the light guide panel 620 and then the path of the light is changed toward the coupled substrates 100 and 200. An LED or a fluorescent lamp may be used as the light source 610.

The light guide panel 620 changes the path of light, emitted from the light source 610, toward the coupled substrates 100 and 200. For the change of the light path, although not shown, a groove or protrusion pattern having various shapes is formed at the light guide panel 620.

The optical sheet 430 is formed on the light guide panel 420 and conformally supplies light to the coupled substrates 100 and 200, and may be formed by the combination of a diffuser sheet and a prism sheet.

The reflector 640 is formed under the light guide panel 620 and reflects light, which is leaked to under the light guide panel 620, to an upper portion thereof, thus increasing light efficiency.

The coupling member 700 couples the coupled substrates 100 and 200 and the support member 500. Specifically, the coupling member 700 is formed between the coupled substrates 100 and 200 and the guide frame 520 and, by coupling the coupled substrates 100 and 200 to the guide frame 520, prevents the deviation of the coupled substrates 100 and 200 toward an upper portion thereof. The coupling member 700 may use an adhesive such as a double-sided tape, a thermosetting adhesive, or a photocurable adhesive.

FIG. 15 is a sectional view schematically illustrating an LCD device according to another embodiment of the present invention. Except that the configuration of the support member 500 is changed, the LCD device of FIG. 15 has the same configuration as that of FIG. 14.

The support member 500 includes a set cover 510, a guide frame 520, and a support case 530. The configuration of the set cover 510 differs from that of the above-described LCD device of FIG. 14.

As seen in FIG. 15, the set cover 510 does not contact a side surface of the coupled substrates 100 and 200 but contacts a bottom of the coupled substrates 100 and 200, more specifically, a bottom of an upper substrate (for example, a bottom of the second substrate 200) and a bottom of an lower substrate (for example, a bottom of the first substrate 100).

As described above, since the set cover 510 contacts the bottom of the coupled substrates 100 and 200, the Bezel of the LCD device is completely removed, and thus, a aesthetic appearance can be more enhanced. Also, since the set cover 510 does not contact the side surface of the coupled substrates 100 and 200, the front of the LCD device is configured with only the coupled substrates 100 and 200.

According to the embodiments of the present invention, all or some of the signal lines for supplying signals to the gate lines (which are formed on the first substrate) are formed on the second substrate where the gate lines are not formed, and thus, the non-display area of the LCD device is reduced. Accordingly, the size of the Bezel of the LCD device can decrease, and a aesthetic appearance can be enhanced.

The above explanation shows a LCD device corresponding to one of the display devices. However, the display devices according to the present invention are not limited to the above liquid crystal display device. The LCD devices according to the present invention may be applied to various flat display devices such as organic light emitting display device (OLED), EPD, etc. For example, in case of the display device of the organic light emitting display device, an organic light emitting device is formed on upper or lower substrate, and the organic light emitting device is driven by a panel driver connected to the upper substrate so that an image is displayed by light emitted to the external through the upper substrate.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

The invention claimed is:

1. A display device, comprising:
   first and second substrates facing each other;
   a plurality of gate lines and data lines on the first substrate to define a plurality of pixels by an intersection therebetween;
   a connection line on the first substrate to be electrically connected to the gate line;
   a signal line on the second substrate for supplying a signal to the gate line;
   a first bridge on the second substrate for electrically connecting the signal line and the connection line;
   a passivation layer comprising a first contact hole exposing the connection line;
   a connection electrode connected to the connection line through the first contact hole; and
   a black matrix comprising a second contact hole exposing the signal line.

2. The display device of claim 1, wherein one end of the first bridge is connected to the signal line through the second contact hole, and the other end of the first bridge is protruded to contact with the connection electrode.

3. The display device of claim 1, wherein the first bridge protrudes into the first contact hole.

4. The display device of claim 1, wherein the first bridge protrudes to contact the connection electrode.

5. The display device of claim 1, further comprising:
an adhesive member between the first bridge and the connection electrode.

6. The display device of claim 5,
wherein the adhesive member comprises a conductive ball.

7. The display device of claim 1, further comprising:
a second bridge connected to the signal line, and
a gate pad connected to the second bridge.

8. The display device of claim 7, further comprising:
a gate insulation layer exposing the gate pad; and
a pad electrode connected to the gate pad,
wherein the black matrix further exposes a part of the signal line, and
wherein the passivation layer further exposes the gate pad.

9. The display device of claim 8,
wherein the second bridge connects the signal line and the gate pad.

10. The display device of claim 1, further comprising:
a gate pad on the second substrate, and wherein the gate pad and the signal line are electrically connected.

11. The display device of claim 1, further comprising:
a data pad on the second substrate, and
a third bridge on the second substrate for electrically connecting the data pad and a data line.

12. The display device of claim 1, further comprising:
a backlight unit disposed under the coupled substrate with the first and second substrate; and
a support member supporting the coupled substrate and the backlight unit,
wherein the support member comprises a set cover contacting a bottom of the coupled substrate.

13. The display device of claim 1, further comprising:
a backlight unit disposed under the coupled substrate with the first and second substrate; and
a support member supporting the coupled substrate and the backlight unit,
wherein the support member comprises a set cover contacting a side surface of the coupled substrate.

* * * * *